United States Patent
Garnett et al.

(10) Patent No.: US 7,836,780 B2
(45) Date of Patent: Nov. 23, 2010

(54) SENSOR TUBE WITH REDUCED COHERENT VORTEX SHEDDING

(75) Inventors: John Everett Garnett, Boulder, CO (US); Stephen Arthur Ifft, Longmont, CO (US); Marcos A. V. Peluso, Chanhassen, MN (US); David Eugene Wiklund, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 206 days.

(21) Appl. No.: 12/072,494

(22) Filed: Feb. 26, 2008

(65) Prior Publication Data

US 2009/0211368 A1    Aug. 27, 2009

(51) Int. Cl.
*G01F 1/32* (2006.01)
(52) U.S. Cl. .................................... 73/861.22
(58) Field of Classification Search ............... 374/208; 73/861.22, 861.18, 861.354, 861.65, 861.02; 405/224, 216

See application file for complete search history.

(56) References Cited

U.S. PATENT DOCUMENTS

| | | | |
|---|---|---|---|
| 3,774,452 A * | 11/1973 | Tullos et al. | 73/742 |
| 4,154,100 A | 5/1979 | Harbaugh et al. | |
| 4,823,615 A | 4/1989 | Taha | |
| 4,957,005 A * | 9/1990 | Yard et al. | 73/861.355 |
| 4,991,976 A | 2/1991 | Byles | |
| 5,036,711 A | 8/1991 | Good | |
| 5,557,973 A * | 9/1996 | Koudal et al. | 73/861.355 |
| 5,817,950 A | 10/1998 | Wiklund et al. | |
| 6,321,166 B1 | 11/2001 | Evans et al. | |
| 6,349,664 B1 * | 2/2002 | Brown et al. | 114/264 |
| 6,470,755 B1 | 10/2002 | Beachey et al. | |
| 6,520,028 B1 * | 2/2003 | Van Cleve et al. | 73/861.354 |
| 6,564,651 B1 | 5/2003 | Bowers | |
| 6,601,460 B1 | 8/2003 | Materna | |
| 6,782,328 B2 | 8/2004 | Lovegren et al. | |
| 6,868,741 B2 | 3/2005 | Harman | |
| 6,928,884 B1 | 8/2005 | Pearson | |
| 6,957,586 B2 | 10/2005 | Sprague | |
| 2002/0020225 A1 * | 2/2002 | Sakai et al. | 73/861.22 |
| 2002/0168232 A1 * | 11/2002 | Xu et al. | 405/224 |
| 2005/0034535 A1 * | 2/2005 | Sprague | 73/861.22 |
| 2006/0280559 A1 * | 12/2006 | Allen et al. | 405/216 |
| 2008/0031306 A1 * | 2/2008 | Yamada et al. | 374/208 |

FOREIGN PATENT DOCUMENTS

GB    2442488 A    9/2008

OTHER PUBLICATIONS

PCT/US 09/01142 "PCT Notification of Transmittal of the International Search Report and the Written Opinion of the International Searching Authority, or the Declaration" Mailed Apr. 24, 2009, 10 pages.

* cited by examiner

*Primary Examiner*—Jewel Thompson
(74) *Attorney, Agent, or Firm*—Kinney & Lange, P.A.

(57) ABSTRACT

A device comprises a sensor tube for placement in a process flow and a flow-modifying element. The flow-modifying element is formed on the sensor tube, in order to reduce flow-induced vibrations by reducing coherent vortex shedding in the process flow.

35 Claims, 4 Drawing Sheets

SENSOR TUBE WITH REDUCED COHERENT VORTEX SHEDDING

BACKGROUND

This invention relates generally to fluid processing and related measurements. Specifically, the invention concerns a reduced vibration sensor tube for measuring a process parameter in a fluid flow. The sensor tube is configured to reduce coherent vortex shedding and reduce flow-induced vibrations. This lowers structural demands on the sensor tube, increases sensor and sensor tube service life, and improves signal quality by reducing vibration-induced noise.

Safe, accurate, and cost-effective fluid measurements are important to a wide range of industrial and scientific processes. Many of these applications require measurements using sensor tubes such thermowells, Pitot tubes and similar structures, which are positioned directly in a process flow stream in order to communicate a process parameter to a process sensor, in order to monitor the process parameter.

Process parameters are physical variables such as temperatures and pressures, which typically characterize a process fluid. Process sensors are used to sense or measure the process parameters by generating sensor signals as functions of the parameters. Typical sensors include thermocouples, resistance-temperature detectors, pressure transducers, flow sensors, PH sensors and other sensor devices configured to sense or characterize a wide range of process fluid parameters and other process variables.

In some applications, a sensor tube and a sensor make up a standalone sensor module. In other applications, the sensor module is combined with a mounting structure and a transmitter/connection head with a controller and input/output (I/O) interface, in a configuration typically referred to as a field device. Field devices typically perform additional signal processing and monitoring functions, generate higher-order outputs for communication with process measurement and control systems. In some configurations, field devices also perform process control functions. Representative sensor modules and field devices are available from a number of commercial inventors, including, for example, Rosemount Inc. of Chanhassen, Minn., a division of Emerson Process Management.

Because thermowells, Pitot tubes, and other sensor tube structures are situated directly in the process flow, they are subject to a number of stress factors including flow-induced vibrations. Flow-induced vibrations typically arise as a result of vortex shedding and other turbulent wake field effects, which generate periodically alternating forces on the sensor tube. These forces cause the tube to oscillate back and forth or vibrate, increasing mechanical stress and reducing service life for both the sensor tube and its associated sensor. Flow-induced vibrations are particularly problematic when they occur near a natural resonant frequency, producing forced resonant oscillations that can result in catastrophic failure. Even relatively small oscillations can also be an issue, particularly when combined with other stresses such as high drag forces or static pressure gradients, or with corrosion, fatigue, or erosion of the sensor tube structure.

Previously, the problem of sensor tube vibrations was addressed by increasing the strength of the sensor tube. This approach requires thicker tube walls or specialized construction, which increases cost, expands the devices' size and weight envelope, decreases sensitivity and increases response time. There is thus a need for flow-induced vibration reduction techniques that are not limited to mechanical strengthening, and are applicable to a range of different sensor tube configurations.

SUMMARY

This invention concerns a device for placement in a process flow. The device comprises a sensor tube with a flow-modifying element. The sensor tube is configured for placement in the process flow, and the flow-modifying element is formed on the sensor tube. The flow-modifying element is shaped to reduce flow-induced vibrations of the sensor tube, by reducing coherent vortex shedding in the process flow.

DETAILED DESCRIPTION

Figure 1A:
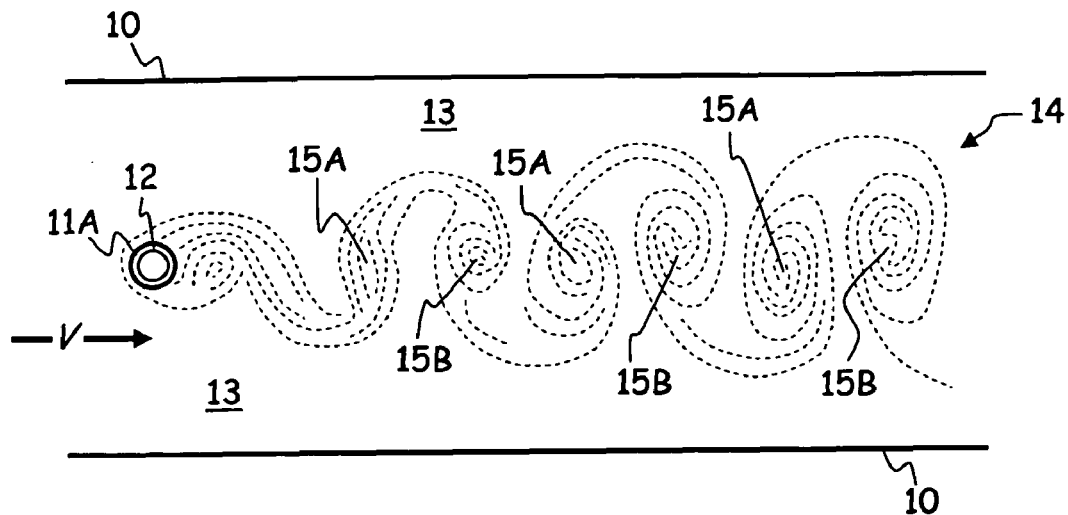
FIG. 1A is a schematic top view of a flow conduit, illustrating vortex shedding by a prior-art sensor tube.

FIG. 1A is a schematic top view of flow conduit 10, illustrating vortex shedding by prior-art sensor tube 11A. In this particular example, sensor tube 11A is a right circular cylinder (shown in cross section), which communicates a process parameter describing fluid 13 to sensor 12.

As shown in FIG. 1A, sensor 12 is a thermocouple or resistance-temperature detector (RTD), located within sensor tube 11A, adjacent an inside wall. In this embodiment, sensor 12 is in thermal communication with sensor tube 21, and senses the temperature of a process fluid proximate the sensor tube by generating a sensor signal such as a voltage or a current, which is a function of the temperature as described above. In this embodiment sensor tube 11A comprises a thermowell, which communicates or transmits the process fluid temperature to sensor 12 via thermal conduction. In other embodiments, such as Pitot tube embodiments, sensor 12 is located in a sensor housing adjacent to or external to sensor tube 11A. In these embodiments, the sensor tube communicates or transmits the process fluid parameter to sensor 12 via pressure apertures, impulse tubing, flow tubes, or a combination of such elements.

Fluid 13 flows past sensor tube 11A at bulk (or average) flow velocity V, creating downstream wake field 14. For some velocities V, wake field 14 is a generalized turbulent wake field, without periodic structure. Over a wide range of flow velocities, however, sensor tube 11A alternately sheds right-handed vortices 15A (with counterclockwise rotation) and left-handed vortices 15B (with clockwise rotation). When this behavior is exhibited, wake field 14 is typically known as a vortex trail or von Karman street.

Von Karman streets are a common feature of fluid flow. They are observed over many different size scales, from micro-fluidics to oceanography and global weather patterns. In the specific application of fluid processing, vortex streets are problematic because right-handed vortices 15A and left-handed vortices 15B carry alternating-sign momentum away from sensor tube 11, resulting in flow-induced vibrations.

For some process conditions, the rate and strength of vortex shedding is substantially described as a function of bulk (average) flow velocity V, and the resulting sensor tube vibrations are described in terms of the first-order bending mode. In this model the sensor tube oscillates back and forth from its base, with amplitude as a function of the flow velocity. Vortex shedding is however a highly complex and nonlinear process, in which shear, turbulence and other non-uniform flow velocity components also play important roles. In more realistic approaches, moreover, higher-order oscillations must also be incorporated, as well as the effects of additional process parameters such as temperature, density and viscosity.

Figure 1B:
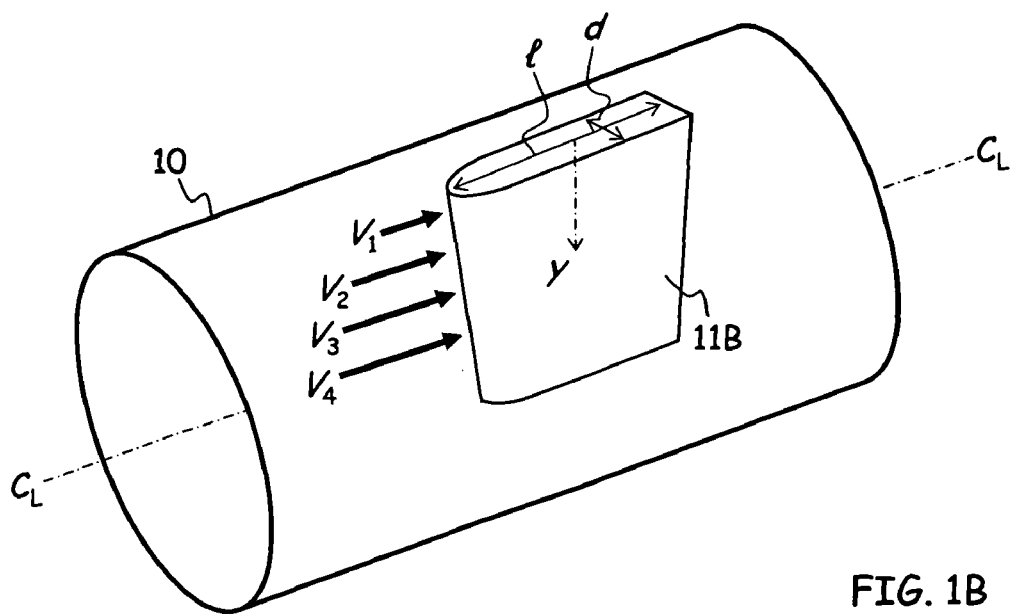
FIG. 1B is a perspective view of a vortex shedding body in a turbulent process flow.

FIG. 1B is a perspective view of vortex-shedding body 11B in a turbulent process flow. In this more detailed example, the axial flow velocity is a function of spanwise position y (measured perpendicularly from flow conduit 10), and average flow velocity V is integrated across the process flow structure.

Turbulent process flow has both axial and non-axial components, however, which typically vary over a range of size and time scales. This distinguishes from the case of uniform flow, in which the velocity is axial and constant, and from shear or laminar flow, in which the velocity varies in spanwise direction y but the variation is relatively uniform, and remains axial. In turbulent flow, on the other hand, there are both axial and non-axial components, and these components vary not only in y but also in angular position.

Turbulent flow also exhibits a different spanwise profile than does laminar or shear flow. In turbulent flow the velocity rises rapidly from the conduit boundary, but peaks more gradually toward the center than in a laminar field. This makes the problem of process flow-induced vibrations significantly different from other, non-analogous applications such as car antennas, smokestacks and airplane wings, where the flow is relatively constant or is dominated by shear and other boundary effects.

In FIG. 1B, simple right circular cylinder flow tube 11A of FIG. 1A is replaced by more generalized vortex-shedding body 11B. Body 11B is a representative vortex-shedding structure, illustrating various sensor tube features but not necessarily reflecting any particular design. Body 11B is characterized by an oblong geometry with a roughly airfoil cross section. At the upper boundary of flow channel 10 (where y=0), body 11B has width d, measured perpendicularly to y and across the axial flow direction, and length l, measured along the axial flow direction (along centerline $C_L$).

Body 11B does not have a fixed cross section, but tapers in both length l and width d as a function of spanwise position y. This corresponds with a rapid increase in the average flow velocity from $V_1$ to $V_2$ at the outer boundary of flow conduit 10 (near y=0), and a more gradual increase to $V_3$ and $V_4$ toward the axis (along centerline $C_L$).

In addition to the circular and airfoil cross sections shown in FIGS. 1A and 1B, sensor tubes also exhibit oval, oblong, rectangular, T-shaped and other geometries, in both tapered and non-tapered configurations. In the particular configuration of FIG. 1B, moreover, sensor tube/vortex-shedding body 11B is cantilevered; that is, it is supported at only one boundary of the flow conduit (at the top in FIG. 1B, with y≈0). In other configurations, body 11B is supported at both ends (see, e.g., FIG. 4).

The analysis of fluid flow around a vortex-shedding structure such as body 11B typically begins with the Reynolds number (Re), a dimensionless parameter characterizing the ratio of inertial to viscous forces in the flow field. The Reynolds number is $$Re = \frac{\rho V d}{\mu}, \quad [1]$$

where ρ is the fluid density, V is the average (or bulk) flow velocity, d is the width of the body in the flow, and μ is the absolute viscosity.

In the case of shear flow about a tapered flow tube, both V and d are functions of the perpendicular or spanwise position y. The vortex shedding frequency (f) is related to these quantities by a second dimensionless parameter known as the Strouhal number (St):

$$St = \frac{fd}{V}. \quad [2]$$

Over a wide range of Reynolds numbers, vortex energy in the downstream wake field is dominated by large-scale wake instabilities, which in turn are characterized by a single, relatively constant low-frequency value for St. In this regime, EQ. 2 predicts that the vortex shedding frequency (f) is substantially linear with bulk (average axial) flow velocity V. Vortex amplitude is proportional to $V^2$, and is typically defined in units of pressure such that the amplitudes scale with forces on the shedding structure.

In the simplest approach to flow-induced vibration reduction, the shedding frequency is simply compared to the frequency of the first bending mode. The first bending mode is determined by the length and cross-sectional area of the sensor tube and the thickness and material properties of the tube wall (particularly, its Young's modulus). In this approach, flow-induced vibrations can in principle be limited by simply avoiding process configurations (i.e. flow rates) that result in coherent vortex shedding near the first bending mode frequency.

Unfortunately this model is too simplistic for actual process flow conditions, and does not reflect real-world fluid processing requirements. In particular, process measurement devices must accommodate required flow rates, not the other way around. Quantities like the Young's modulus also depend upon temperature and other process variables, which are not always subject to direct and independent control.

More to the point, in a more complete turbulent flow analysis the Strouhal number (St) is not constant, but instead exhibits an irregular stepwise behavior as a function of the ratio y/d. Thus FIG. 1A shows only one "layer" or spanwise slice of a highly complex wake field, in which detached vortices are not shed uniformly along the sensor tube but instead tend to organize into a series of cells as a function of y. Each cell exhibits a different shedding frequency and amplitude distribution (or energy spectrum), and each is capable of exciting different vibrational modes. The result is a broad-frequency vortex-shedding pattern that produces flow-induced vibrations over a wide range of flow velocities (alternatively, Reynolds and Strouhal numbers), and is not limited to a single resonant frequency but can affect almost any sensor tube geometry.

A full understanding of flow-induced vibrations thus requires a detailed analysis of turbulent process flow and sensor tube geometry, including multiple shedding frequencies, higher-order oscillation modes, and (particularly near bends or elbows in the flow conduit) the effects of swirl on the flow field. The result is a multi-dimensional parameter space characterized by a rich variety of vortex-shedding solutions and corresponding modes of oscillation, in which even sophisticated computer models may insufficiently describe the resulting flow-induced vibrations Because the problem is complex, solutions from non-analogous fields such as aircraft wings, smokestacks and car antennas cannot simply be scaled to process flow devices. Instead, the problem must be approached from the unique perspective of each particular sensor tube configuration, and must account not only for bulk and shear flow but also higher-order components of the turbulent flow field. A full solution must also be applicable over a wide range of flow velocities, and should address the effects of other fluid parameters including density, viscosity, pressure and temperature.

Figure 2:
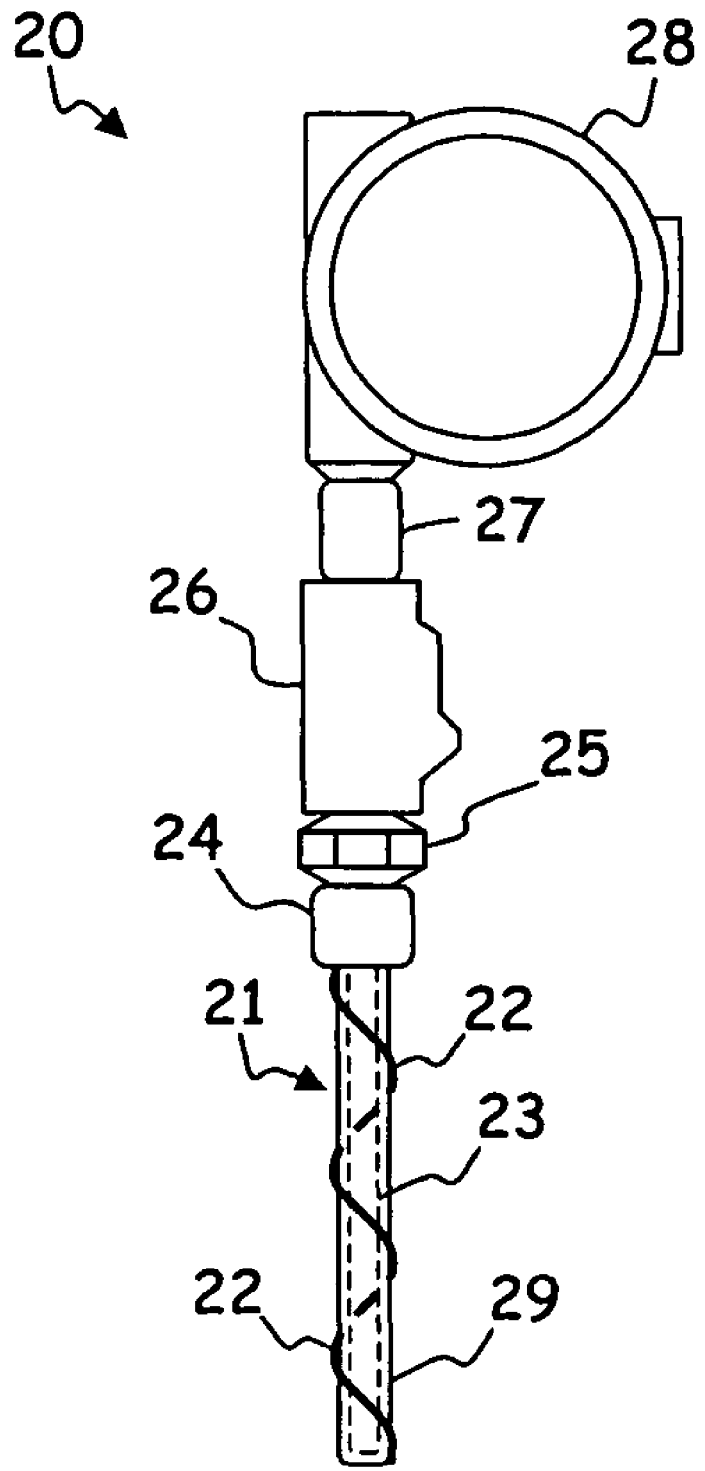
FIG. 2 is a side view of a field device with reduced coherent vortex-shedding.

FIG. 2 is a side view of field device 20 with reduced coherent vortex shedding. Field device 20 comprises sensor tube 21, vibration-reducing element 22 and sensor 23. Sensor 23 is shown in phantom, as are the portions of vibration-reducing element 22 on the back side of sensor tube 21. In the particular embodiment of FIG. 2, field device 20 also comprises compression fitting 24, union 25, seal 26, nipple 27 and transmitter/connection head 28.

As shown in FIG. 2, sensor 23 is a thermal sensor positioned within sensor tube 21, adjacent tube wall 29. In this configuration, sensor tube 21 is a thermowell, which protects sensor 23 and communicates a process parameter (a fluid temperature) to sensor 23 via conduction through tube wall 29. In alternate embodiments sensor 23 is not located within tube wall 29, and sensor tube 21 communicates the fluid property to sensor 23 via pressure apertures or another form of fluid connection (see, e.g., FIG. 4, below).

In general embodiments, sensor 23 represents one or more of a temperature sensor for sensing a process temperature, a pressure sensor for sensing or characterizing a process pressure, a flow sensor for sensing or characterizing a process flow rate, a PH sensor for characterizing a PH, or another sensor device for sensing another process parameter. In some of these embodiments, sensor 23 is a primary sensor and field device 20 also comprises a secondary sensor for characterizing a secondary process parameter, such as a temperature compensation sensor for characterizing a compensation temperature.

Compression fitting 24, union 25, seal 26, and nipple 27 are representative of a general-purpose sensor tube/sensor probe mounting assembly and support structure, and transmitter/connection head 28 is representative of a generalized transmitter housing with generalized controller and I/O interface components. These elements vary from embodiment to embodiment, and are not present in all embodiments. A wide variety of representative configurations with these and other features are available from Rosemount Inc. and other commercial vendors.

Field device 20 monitors a process parameter associated with the process fluid proximate sensor tube 21. Sensor tube 21 communicates the process parameter (or fluid parameter) to sensor 23 via thermal conduction, a flow connection such as a flow tube, a pressure connection such as a pressure aperture or Pitot tube aperture, or analogous means.

Process sensor 23 comprises a primary sensor element or other sensor device positioned for communication with sensor tube 21. In some embodiments, including thermowell embodiments, sensor 23 comprises a thermal sensor, and is positioned in thermal communication with the sensor tube. In these embodiments sensor 23 is typically located inside sensor tube 23, positioned proximate or adjacent to an inside wall of the sensor tube.

In other embodiments, including Pitot embodiments, sensor 23 is positioned for pressure or flow communication with sensor tube 21. In these embodiments, sensor 23 comprises a Pitot sensor, and is positioned in direct communication with sensor tube 21, via Pitot apertures or pressure apertures in the sensor tube. Alternatively, the Pitot sensor is positioned in remote communication with sensor tube 21, by means of impulse tubing or other fluid connection to sensor tube 21.

Sensor element 23 senses the fluid parameter in a fluid flow proximate sensor tube 21, and generates a sensor signal such as a voltage, a current or a digital sensor signal, which is a functional representation of the parameter. In embodiments that include transmitter/connection head 28, field device 20 also generates an output representative of the sensor signal for communication with a process control system. In some of these embodiments field device 20 also receives a process input, and performs process control functions.

Sensor tube 1 is configured for positioning in a process conduit or for other forms of placement in a process flow. When sensor tube 21 is exposed to the process flow, it is subject to flow-induced vibrations as described above. These vibrations cause mechanical stress on sensor tube 21, sensor 23, and other components of field device 20. This reduces sensor and sensor tube service life, either due to the vibrations themselves, or a combination of flow-induced vibrations and high static drag forces, large differential pressures, erosion, corrosion, or fatigue. A range of potential failure modes result, from localized cracks and leaks to electrical shorts, broken wires or cracked mandrels in an RTD or other sensor, and even catastrophic failure of sensor tube 21 or sensor 23.

Flow-modifying element 22 is shaped to reduce coherent vortex shedding by sensor tube 21, and to reduce the resulting flow-induced vibrations. In particular, flow-modifying (or vibration-reducing) element 22 reduces coherent vortex shedding by modifying flow at the boundary layer, controlling the point of detachment in order to alter the amplitude distribution and shedding frequency of vortices in the wake field. This decreases the energy available for resonant excitation of sensor tube 21, increasing service life and reliability for both sensor tube 21 and sensor 23. In some embodiments, flow-modifying element 22 also expands the operational ranges of sensor tube 21 and sensor 23, and reduces signal noise generated by sensor 23, by reducing mechanical, thermodynamic or electronic noise effects associated with flow-induced vibrations.

Field devices with a lower level of flow-induced vibrations provide greater flexibility in the design of sensor tube 21, particularly in applications where required response times make increased wall thickness an unacceptable solution. This facilitates efforts to reduce costs and lower the overall weight and size envelope, while increasing sensitivity and reliability.

Figure 3:
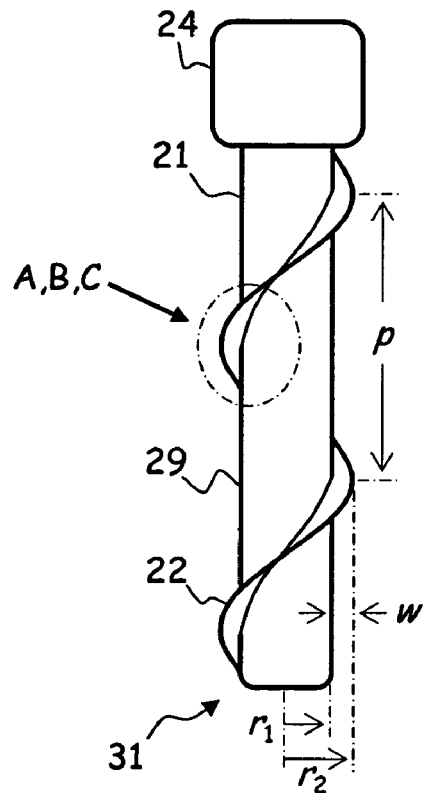
FIG. 3 is a side view of a sensor tube with a vibration-reducing element.

FIG. 3 is a side view of sensor tube 21 with vibration-reducing/flow-modifying element 22. In this particular embodiment, element 22 winds around sensor tube 21 in a spiral path along tube wall 29.

In some embodiments, the spiral path is characterized by a helical or truncated helicoid function. A helicoid is a minimal surface defined in the x-z plane as a function of spanwise position y:

$$x = r\cos(ay); \quad [3A]$$

$$z = r\sin(ay). \quad [3B]$$

The axis of the helicoid lies in the y direction. The constant a determines the twist rate or "pitch" of the helicoid, as a function of rotational angle $\theta = ay$. For $a=0$, for example, there is no twist and rotational angle .theta. is always zero. Thus z=0 everywhere, and the helicoid is just the (untwisted) x-y plane. As a varies from 0, the plane is continuously twisted (homeomorphed) into a spiral or "Archimedes screw" shape, in which a>0 describes a right-handed spiral (a structure with right-handed helicity) about the y axis and a<0 describes a left-handed spiral (a structure with left-handed helicity) about the y axis.

Measuring angles in radians, the pitch (the distance between twists, per unit length along y) is p=2π/a. If angles are measured in degrees rather than radians, the pitch is 360°/a. In some embodiments pitch p is relatively small, such that vibration-reducing element 22 winds two or more times around sensor tube 21, as shown in FIG. 3. In other embodiments pitch p is relatively large, such that vibration-reducing element 22 winds fewer than two times. In further embodiments pitch p varies as a function of spanwise position y, winding more tightly in some regions of sensor tube 21, and less tightly in other regions.

In various embodiments element 22 extends along substantially the entire length of sensor tube 21, as shown in FIG. 3, or along part of the length. In these latter embodiments, element 22 typically winds around tip region 31, which is the region most distant from the mounting structure (as represented by compression fitting 24). In some cases, however, element 22 winds around the region near the mounting structure, or around an intermediate region.

Alternatively, element 22 comprises a number of discrete or discontinuous helical structures, such as notches, grooves, protrusions or regions of different surface finish, which are separated by regions in which the structure is absent. In these embodiments element 22 is formed as at least one set of structures, where each individual structure in the set is formed or shaped along part of a helical or spiral path, and the set of structures together defines the helical or spiral path.

In EQS. 3A and 3B, each value of r defines a helix about the z axis, and the helicoid is the union of these helices. Alternatively, the helicoid is defined as a ruled surface formed by drawing a semi-infinite line from the origin out along the x axis, then rotating the line in the x-z plane as a function of y. In this interpretation, each point on the line sweeps out a helix, and the entire line sweeps out the helicoid.

For the ideal helicoid, radius r runs from 0 (at the y axis) toward +∞, so that the helicoid extends toward ±∞ in both x and z (that is, the helicoid is unbounded). To create a physical vibration-reducing element, the helicoid is truncated at a first radius $r_1$, corresponding to wall 29 of sensor tube 21, and a second radius $r_2$, with finite width $w=|r_2-r_1|$.

Because the ideal helicoid of EQS. 3A and 3B is generated as a homeomorph of the x-z plane, it is also infinitely thin. Again, this is non-physical. For actual vibration-reducing/ flow-modifying elements 22, the truncated helicoid defines only a "backbone" or template for the spiral path of the vibration-reducing structure, along which each individual element 22 is formed with a finite thickness that extends above or below the helicoid (see FIGS. 3A-3C).

For sensor tubes 21 comprising right circular cylinders, first (inner) radius $r_1$ and second (outer) radius $r_2$ are typically fixed as shown in FIG. 3. For tapered sensor tubes, the inner and outer radii are typically functions of spanwise position y. For sensor tubes with more general cross sections, the radii are also functions of angular position θ; that is, first radius $r_1$ maps out the cross section of sensor tube 21 along tube wall 29, and second radius $r_2$ maps out the width w of vibration-reducing element 22 with respect to tube wall 29. In further embodiments, pitch p and width w each vary independently with spanwise position y, and/or with rotational angle θ.

Under appropriate flow conditions, boundary layers along sensor tube 21 separate, and the sensor tube sheds detached vortices. When one vortex is shed at the same time that another (opposite-handed) vortex forms on the other side of the sensor tube, the vortices begin to alternate and coherent shedding results. Coherent vortex shedding generates a von Karman street or vortex trail, and results in flow-induced vibrations as described above.

Vibration-reducing/flow-modifying element 22 is formed by considering the range of process parameters that describe the flow field, and mapping the pitch, thickness and width of element 22 to the particular geometry of sensor tube 21 such that coherent vortex shedding is disrupted. In particular, element 22 controls the detachment point to prevent periodic shedding of alternating vortices on opposites sides of the sensor tube. This reduces coherent vortex shedding, and modifies the energy spectrum (amplitude distribution) and frequency spectrum of vortices in the downstream wake field. Note that flow-modifying element 22 does not necessarily reduce the total energy shed in the form of vortices, but it does reduce the total energy available for exciting oscillations of sensor tube 21.

More specifically, flow-modifying element 22 disrupts vortex shedding by altering the boundary layer flow, encouraging separation at prescribed points determined by the geometry of sensor tube 21 and element 22, rather than by an unmodified sensor tube structure as in previous designs. Typically, element 22 follows a spiral or helical path, as shown in FIG. 3, which further reduces coherent vortex shedding by encouraging detachment at locations that are not oppositely located on different sides of sensor tube 21. In some embodiments, element 22 also encourages detachment at intervals that are aperiodic, or otherwise do not correspond to resonant frequencies (natural modes) of sensor tube 21.

Because many contributions to coherent vortex shedding are non-linear (and thus not typically intuitive or scalable), the most effective vibration-reducing structures vary from embodiment to embodiment. Each different flow-modifying element 22 thus varies in pitch, width, thickness, and other geometrical features. These features cannot be predicted by or scaled from non-analogous fields that do not exhibit the same probe and conduit geometries, and do not have the same turbulent process fluid flow characteristics.

Figure 3A:
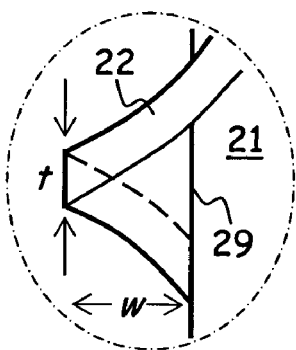
FIG. 3A is an enlarged view showing one embodiment of the vibration-reducing element in FIG. 3.

FIG. 3A is an enlarged view showing one embodiment of vibration-reducing/flow-modifying element 22, in the region of FIG. 3 indicated by arrow A,B,C. In this embodiment, element 22 is a ridge, protrusion or other raised structure that follows a spiral path to form a helix or helicoid on outside wall 29 of sensor tube 21. Element 22 has a first radius at the sensor tube wall, and a second radius at width w from the first radius. Element 22 also has thickness t, which is defined about the idealized (thin) helicoid of EQS. 3A and 3B.

In the configuration of FIG. 3A, vibration-reducing/flow modifying element 22 has a sharp leading edge defined by thickness t less than width w (that is, t<w). In other embodiments, thickness t is comparable to width w (t≈w), or, alternatively, element 22 has a blunt leading edge defined by thickness t greater than width w (t>w).

In further embodiments, the vibration reducing element comprises a number of helical or spiral structures. In some of these embodiments, the structures have generally similar physical characteristics, as described, for example, in FIGS. 3A, 3B and 3C. In these embodiments, the structures are generally parallel and laterally spaced, and element 22 is characterized by an overall helicity that is either right-handed or left-handed, but not both. In other embodiments, the structures have different physical characteristics, such as different thicknesses, widths, pitches or helicities. In some of these embodiments, element 22 is characterized by both right-handed and left-handed helicities.

For embodiments in which element 22 comprises a number of different structures, the structures are sometimes discontinuous, as described above, in order to avoid physical intersections between structures or sets of structures with different physical characteristics. Specifically, for embodiments that include both right-handed and left-handed spiral structures, the structures are sometimes discontinuous at points where the right-handed and left-handed spiral paths cross.

Figure 3B:
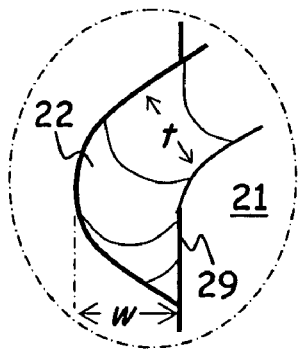
FIG. 3B is an enlarged view showing an alternate embodiment of the vibration-reducing element in FIG. 3.

FIG. 3B is an enlarged view showing an alternate embodiment of vibration-reducing/flow modifying element 22, in the region of FIG. 3 indicated by arrow A,B,C. In this embodiment, width w and thickness t are substantially equal (w≈t), as determined by a diameter of element 22.

In one method of manufacturing this embodiment, element 22 is formed from a deformable cylinder or wire-shaped structure with a substantially circular cross section. This structure is spiral wound around sensor tube 21 to form helical element 22, and attached to the sensor tube by means of welding or other mechanical technique.

The embodiment of FIG. 3B has manufacturing advantages, but does not have as sharp a leading edge as the embodiment of FIG. 3A. As a result, the wake field is more or less turbulent than in other embodiments. The advantage of reduced flow-induced vibrations is nonetheless retained, because element 22 still disrupts the process of coherent vortex shedding.

Figure 3C:
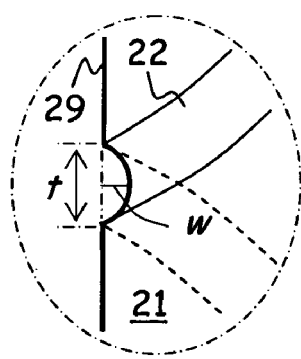
FIG. 3C is an enlarged view showing a further alternate embodiment of the vibration-reducing element in FIG. 3.

FIG. 3C is an enlarged view showing a further alternate embodiment of vibration-reducing/flow modifying element 22, in the region of FIG. 3 indicated by arrow A,B,C. In this embodiment, element 22 is formed as a spiral groove (equivalently, a trough, channel or other depression) in sensor tube 21, which follows a spiral, helical or helicoid path along tube wall 29. Thickness t is measured in a perpendicular direction, and width w corresponds to a depth, measured from first (outer) radius at the outer surface of tube wall 29, and second (inner) radius at the bottom or deepest part of the groove.

The grooved embodiment of FIG. 3C is typically formed by milling or similar machining process, but can also be formed by molding or casting element 22 as a unitary structure with sensor tube 21. The groove profile is variously arcuate or semicircular (as shown in FIG. 3C), or substantially rectangular or v-shaped, or has another form. In some of these embodiments, the groove is formed as a slot or a notch that is cut, machined, molded, or otherwise shaped into a side of sensor tube 21, along wall 29.

The depth of the groove in FIG. 3C is typically limited by structural considerations, including the thickness of tube wall 29. Alternatively, the vibration-reducing element is formed by milling or machining tube wall 29 to fashion a surface finish, such as a rough surface finish, in a helical or spiral pattern, rather than actually forming a groove or other structure in the tube wall. In these embodiments, the variation in surface finish controls the detachment point by altering laminar flow rates and other flow features proximate the surface, rather than via larger-scale structures such as a helical groove or raised spiral structure (a spiral or helical protrusion).

Thus the different embodiments described here are not typically suitable to the same sensor tube geometries and process flow conditions. Each is configured for a particular sensor tube geometry, and for particular process fluid flow conditions. The results are nonetheless analogous, in that coherent vortex shedding is reduced, the frequency and energy spectra (amplitude distribution) of vortices are altered in the downfield wake, and the energy available for flow-induced vibrations is reduced.

Figure 4:
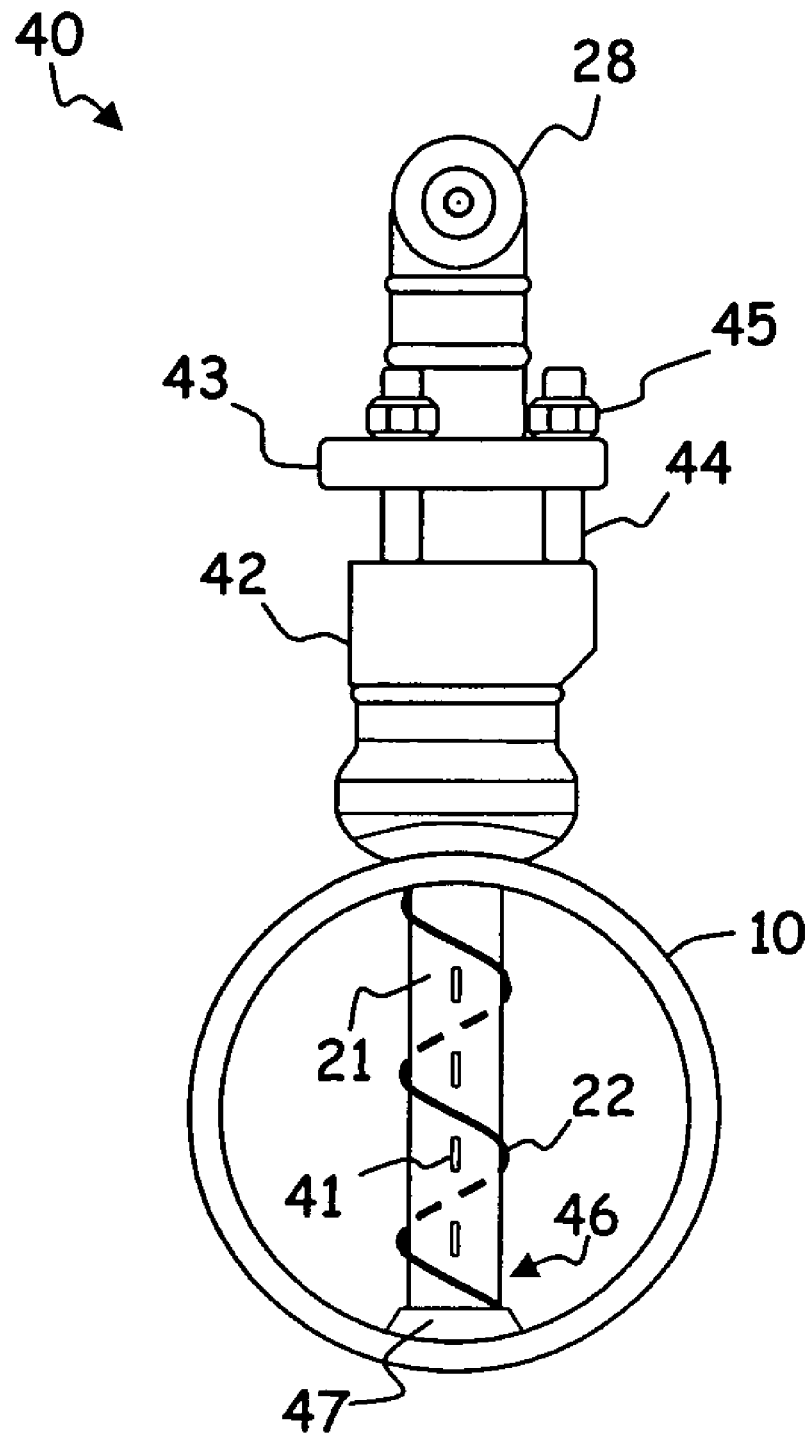
FIG. 4 is a side view of a vibration-reducing field device, illustrating an alternate mounting and sensor tube configuration.

FIG. 4 is a side view of reduced coherent vortex-shedding field device 40, illustrating an alternate mounting and sensor tube configuration. In this embodiment sensor tube 21 is an averaging Pitot tube and field device 40 comprises an averaging Pitot tube sensor assembly.

The Pitot sensor assembly comprises sensor tube/Pitot tube 21 with apertures 41 and vibration-reducing/flow-modifying element 22. Pitot tube 21 is a representative device, encompassing averaging and non-averaging Pitot tubes and Pitot probes, and is positioned within flow conduit 10 to measure a process fluid flow in a direction that is primarily in or out of the plane of the figure.

In the particular configuration of FIG. 4, field device 40 also comprises mounting flange assembly 42, which is connected to sensor flange 43 via studs 44 and nuts 45, and transmitter/connection head 28. These elements are merely representative, and vary from embodiment to embodiment as described above with respect to compression fitting 24, union 25, seal 26, and nipple 27 of FIG. 2. In some embodiments, for example, opposite-end support 47 is provided to support tip region 46 of sensor tube 21 against conduit 10. In other embodiments, sensor tube 21 exhibits a cantilevered mounting structure, which is supported only at mounting flange assembly 42, and element 22 sufficiently reduces flow-induced vibrations to eliminate the need for opposite-side support 47. In further embodiments the mounting structure is absent, and only sensor tube 21 and a sensor are provided.

Apertures 41 are pressure apertures or Pitot ports, which transmit a process parameter that is a pressure (or average pressure) to a primary sensor. The primary Pitot sensor (not shown) is positioned for communication with Pitot tube/sensor tube 21. Specifically, the Pitot sensor is in pressure communication with sensor tube 21 via one or more of apertures 41. In some embodiments the Pitot sensor is positioned adjacent sensor tube 21, and in other embodiments the Pitot sensor is positioned remotely, and communicates with sensor tube 21 via impulse tubing or other means, as described above.

In general, vibration-reducing/flow-modifying element 22 is configurable to the particular geometry of sensor tube 21, such that coherent vortex shedding is disrupted and flow-induced vibrations are reduced. The thermowell embodiment of FIG. 2 and the Pitot tube embodiment of FIG. 4 are illustrative of a wide range of such geometries, including right circular cylinders and geometries with oval, oblong, wedge-shaped, airfoil-shaped or T-shaped cross sections, and both tapered and non-tapered configurations.

FIGS. 2-4 are similarly representative of a wide range of sensor tube and vibration-reducing element configurations. In particular, some sensor tubes 21 are closed to fluid flow, particularly in thermowell embodiments, and some sensor tubes are open to fluid flow, particularly in Pitot tube embodiments.

Closed-flow geometries are typically sealed, while open-flow geometries variously exhibit apertures 41 along the span, as shown in FIG. 4, at tip region 46, or both. Apertures 41 exhibit a number of forms, including slots, as shown in FIG. 4, circular apertures, oval apertures and other geometries. The particular configuration depends, for example, upon whether the sensor tube in question is a Pitot tube or an averaging Pitot tube, or another, more generalized sensor tube for a flow meter, integrated flow controller, PH sensor, or another general-purpose fluid processing measurement and control device.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A device comprising:
    a sensor tube for placement in a process flow, the sensor tube having an inside wall and an outside wall; and
    a flow-modifying element formed along a helical path on the outside wall of the sensor tube;
    wherein the flow-modifying element is shaped to reduce flow-induced vibrations of the sensor tube by modifying flow at a boundary layer of the sensor tube, such that coherent vortex shedding is disrupted in the process flow.

2. The device of claim 1, wherein the flow-modifying element follows the helical path about the outside wall of the sensor tube, such that the flow-modifying element disrupts the coherent vortex shedding by encouraging detachment at aperiodic intervals.

3. The device of claim 2, wherein the helical path is right handed.

4. The device of claim 2, wherein the helical path is left handed.

5. The device of claim 1, wherein the flow-modifying element comprises a groove formed in the outside wall of the sensor tube, along the helical path.

6. The device of claim 1, wherein the flow-modifying element comprises a deformable shape wound onto the outside wall of the sensor tube, along the helical path.

7. The device of claim 1, wherein the flow-modifying element comprises a set of notches shaped into the outside wall of the sensor tube, along the helical path.

8. The device of claim 1, wherein the flow-modifying element comprises a rough surface fashioned on the outside wall of the sensor tube, along the helical path.

9. The sensor of claim 1, wherein the sensor tube comprises a thermowell and further comprising a temperature sensor positioned in thermal communication with the thermowell.

10. The sensor of claim 1, wherein the sensor tube comprises a Pitot tube and further comprising a Pitot sensor positioned in pressure communication with the Pitot tube.

11. The device of claim 1, further comprising a cantilevered mounting assembly for mounting the sensor tube in a conduit.

12. The device of claim 1, further comprising a sensor positioned for communication with the sensor tube in order to sense a fluid parameter in the process flow, wherein the flow-modifying element reduces signal noise generated by the sensor by reducing mechanical, thermodynamic or electronic noise effects associated with the flow-induced vibrations.

13. A sensor comprising:
    a sensor element for generating a sensor signal as a function of a process parameter;
    a sensor tube for communicating the process parameter to the sensor;
    a mounting assembly for mounting the sensor tube in a process flow; and
    a vibration-reducing element formed along a helical path on an outside wall of the sensor tube;
    wherein the vibration-reducing element is shaped for reducing vibrations induced by the process flow by modifying flow at a boundary layer of the sensor tube, such that coherent vortex shedding is disrupted.

14. The sensor of claim 13, wherein the vibration-reducing element reduces the coherent vortex shedding from the sensor tube by controlling a detachment point to modify a frequency spectrum of vortices in a downstream wake field.

15. The sensor of claim 14, wherein the vibration-reducing element further reduces signal noise generated by the sensor element by reducing mechanical, thermodynamic or electronic noise effects associated with the flow-induced vibrations.

16. The sensor of claim 13, wherein the vibration-reducing element forms a spiral about the outside wall of the sensor tube, along the helical path.

17. The sensor of claim 16, wherein the spiral is formed as a groove in the outside wall of the sensor tube.

18. The sensor of claim 16, wherein the spiral is formed as a protrusion from the outside wall of the sensor tube.

19. The sensor of claim 16, wherein the spiral is formed as a surface finish on the outside wall of the sensor tube.

20. The sensor of claim 16, wherein the spiral is formed as a set of discrete structures, wherein each individual structure in the set of discrete structures is formed along part of the helical path and wherein the set of discrete structures is discontinuous in at least one location along the sensor tube.

21. The sensor of claim 13, wherein the vibration-reducing element forms a number of generally parallel, laterally-spaced spirals about the sensor tube, as characterized by an overall helicity that is either right-handed or left-handed, but not both.

22. The sensor of claim 13, wherein the vibration-reducing element forms at least one right-handed spiral about the sensor tube and at least one left-handed spiral about the sensor tube.

23. The sensor of claim 13, wherein the sensor element is positioned adjacent to the sensor tube and further comprising a transmitter for transmitting an output representative of the sensor signal generated by the sensor element.

24. A method of making a sensor tube, the method comprising:
    forming a sensor tube for mounting in a process flow, the sensor tube having an inside wall and outside wall; and
    forming a spiral flow-modifying element along a helical path on the outside wall of the sensor tube, such that the flow-modifying element follows the helical path about the sensor tube;
    wherein the flow-modifying element is shaped to reduce flow-induced vibrations of the sensor tube by modifying flow at a boundary layer of the sensor tube and disrupting coherent vortex shedding from the sensor tube when mounted in the process flow.

25. The method of claim 24, wherein forming the sensor tube comprises forming a thermowell and further comprising positioning a thermal sensor within the thermowell, adjacent the inside wall of the sensor tube.

26. The method of claim 24, wherein forming the sensor tube comprises forming a Pitot tube and further comprising positioning a Pitot sensor in pressure communication with the Pitot tube.

27. The method of claim 24, wherein forming the spiral flow-modifying element comprises forming a groove in the outside wall of the sensor tube, and further comprising mapping a pitch and thickness of the groove to a geometry of the sensor tube such that the coherent vortex shedding is disrupted.

28. The method of claim 24, wherein forming the spiral flow-modifying element comprises forming a protrusion in the outside wall of the sensor tube, and further comprising mapping a pitch and width of the protrusion to a geometry of the sensor tube such that the coherent vortex shedding is disrupted.

29. A method of monitoring a process parameter, the method comprising:
positioning a sensor tube in a process flow, the sensor tube having an inside wall, an outside wall and a helical flow-modifying element formed on the outside wall, the helical flow-modifying element configured to disrupt coherent vortex shedding and reduce flow-induced vibrations of the sensor tube; and
sensing the process parameter with a sensor positioned for communication with the sensor tube;
wherein the flow-modifying element disrupts the coherent vortex shedding by modifying flow at a boundary layer of the sensor tube; and
wherein the flow-modifying element controls a detachment point to prevent periodic shedding of alternating vortices on opposites sides of the sensor tube.

30. The method of claim 29, wherein the flow modifying element comprises at least one of a groove in the outside wall of the sensor tube, a protuberance from the outside wall of the sensor tube, or a machined surface on the outside wall of the sensor tube, and further comprising mapping a pitch of the helical flow-modifying element to the geometry of the sensor tube such that the coherent vortex shedding is disrupted.

31. The method of claim 29, wherein sensing the process parameter comprises sensing a temperature with a temperature sensor positioned inside the sensor tube, adjacent the inside wall.

32. The method of claim 29, wherein sensing the process parameter comprises sensing a flow rate with a Pitot sensor positioned in pressure communication with the sensor tube.

33. The method of claim 29, further comprising transmitting an output signal representative of the process parameter sensed by the sensor, wherein the helical flow-modifying element reduces signal noise generated by the sensor by reducing mechanical, thermodynamic or electronic noise effects associated with the flow-induced vibrations of the sensor tube.

34. The device of claim 1, wherein the flow-modifying element disrupts the coherent vortex shedding by controlling a detachment point to prevent periodic shedding of alternating vortices on opposites sides of the sensor tube.

35. The device of claim 1, wherein the flow-modifying element reduces the flow-induced vibrations of the sensor tube by encouraging detachment at intervals that do not correspond to resonant frequencies or natural modes of the sensor tube.

* * * * *